United States Patent
Cao et al.

(10) Patent No.: US 7,871,955 B2
(45) Date of Patent: Jan. 18, 2011

(54) PLATINUM CATALYSTS FROM IN SITU FORMED PLATINUM DIOXIDE

(75) Inventors: Lixin Cao, Princeton, NJ (US); Yu-Min Tsou, Princeton, NJ (US); Emory De Castro, Nahant, MA (US); Gian Nicola Martelli, Milan (IT)

(73) Assignee: BASF Fuel Cell GmbH, Frankfurt am Main (DE)

( * ) Notice: Subject to any disclaimer, the term of this patent is extended or adjusted under 35 U.S.C. 154(b) by 0 days.

(21) Appl. No.: 11/088,343

(22) Filed: Mar. 24, 2005

(65) Prior Publication Data

US 2005/0227862 A1 Oct. 13, 2005

Related U.S. Application Data

(60) Provisional application No. 60/561,207, filed on Apr. 9, 2004.

(51) Int. Cl.
*H01M 4/88* (2006.01)
*B01J 21/18* (2006.01)
*B01J 23/40* (2006.01)
*B01J 23/74* (2006.01)
*B01F 3/08* (2006.01)
*B01F 3/12* (2006.01)
*C09K 3/00* (2006.01)

(52) U.S. Cl. ............ 502/185; 502/101; 516/32; 516/33; 516/97

(58) Field of Classification Search .......... 502/101, 502/185; 516/32, 33, 97
See application file for complete search history.

(56) References Cited

U.S. PATENT DOCUMENTS

| | | | | |
|---|---|---|---|---|
| 3,532,556 | A | * | 10/1970 | Steele .......... 502/101 |
| 3,992,512 | A | | 11/1976 | Petrow et al. |
| 4,059,541 | A | | 11/1977 | Petrow et al. |
| 4,392,927 | A | | 7/1983 | Fabian et al. |
| 4,716,087 | A | * | 12/1987 | Ito et al. .......... 429/40 |
| 5,876,867 | A | * | 3/1999 | Itoh et al. .......... 429/44 |
| 6,649,300 | B2 | * | 11/2003 | Ito et al. .......... 429/44 |
| 2002/0034675 | A1 | * | 3/2002 | Starz et al. .......... 429/42 |
| 2006/0116285 | A1 | * | 6/2006 | Cao et al. .......... 502/182 |
| 2008/0305946 | A1 | * | 12/2008 | Cao et al. .......... 502/185 |

* cited by examiner

*Primary Examiner*—Patricia L Hailey
(74) *Attorney, Agent, or Firm*—Charles A. Muserlian

(57) ABSTRACT

A carbon-supported platinum catalyst obtained by chemical reduction of in situ-formed platinum dioxide on a carbon support and a method of production thereof.

13 Claims, No Drawings

PLATINUM CATALYSTS FROM IN SITU FORMED PLATINUM DIOXIDE

PRIOR APPLICATION

This application is based on Provisional Application No. 60/561,207 filed Apr. 9, 2004.

FIELD OF THE INVENTION

The invention is directed to a catalyst, in particular to a platinum black or carbon-supported platinum electrocatalyst suitable for incorporation in a gas diffusion electrode or in a catalyst-coated membrane structure.

BACKGROUND OF THE INVENTION

Platinum, either black or carbon-supported, is a well-known catalyst for incorporation in gas-diffusion electrode and catalyst-coated membrane structures, for instance in fuel cell electrolysis and sensor applications. In the prior art, carbon-supported platinum is commonly produced from platinum colloid sols, for instance starting from a complex platinum sulfite acid, as described in U.S. Pat. No. 3,992,512 and U.S. Pat. No. 4,059,541. This method involves oxidation of the $H_3Pt(SO_3)_2OH$ species with hydrogen peroxide ($H_2O_2$), optionally in the presence of carbon, and requires a complicated pH regulation over long reaction times. As a result, an uneven and quite large particle size can result, especially for relatively high platinum loadings.

An alternative route consists of reduction of chloroplatinic acid ($H_2PtCl_6$) with $S_2O_3^{2-}$ ions optionally in the presence of carbon: Pt colloidal particles are thus formed and absorbed on the carbon particles surfaces, but this adsorption is not straightforward, and high platinum loadings are especially difficult to obtain. Again, the formation of colloidal platinum is quite slow, so that large particle size and uneven size distribution are very likely to occur.

The situation is not substantially improved by the method disclosed in U.S. Pat. No. 4,392,927, wherein carbon-supported platinum is prepared by addition of chloroplatinic acid to an alkaline solution containing sodium carbonate. The formation of a non-stoichiometric hydroxide and the non-uniformity of the reaction throughout the solution result in an unsatisfactory average particle size and distribution thereof. These prior art methods have in common a quite low reaction ratio, with the formation of few precipitation nuclei centers that have enough time to grow to consistent particle size. Since electrocatalysis is known to be primarily a surface phenomenon, a large particle size results in a lower catalytic activity per unit of catalyst weight. In other words, the utilization factor of the expensive platinum metal is relatively low.

OBJECTS OF THE INVENTION

It is an object of the invention to provide a carbon-supported platinum catalyst characterized by a small and uniform particle size over a wide range of loadings.

It is another object of the invention to provide a platinum black catalyst characterized by small and uniform particle size.

It is a further object of the invention to provide a gas-diffusion electrode for use in electrochemical applications incorporating a carbon-supported platinum catalyst characterized by small and uniform particle size on an electrically conducting web.

It is an object of the invention to provide a gas-diffusion electrode for use in electrochemical applications incorporating a platinum black catalyst characterized by small and uniform particle size.

It is an object of the invention to provide a catalyst-coated membrane for use in electrochemical applications incorporating a carbon-supported platinum catalyst characterized by small and uniform particle size on an ion-exchange membrane.

Under another aspect, it is an object of the invention to provide a catalyst-coated membrane for use in electrochemical applications incorporating a platinum black catalyst characterized by small and uniform particle size on an ion-exchange membrane.

Under another aspect, it is an object of the invention to provide a method for the formation of a carbon-supported platinum catalyst characterized by small and uniform particle size over a wide range of loadings.

Under yet another aspect, it is an object of the present invention to provide a method for the formation of a platinum black catalyst characterized by small and uniform particle size.

These and other objects and advantages of the invention will become obvious from the following detailed description.

THE INVENTION

Under a first aspect, the invention consists of a platinum black or carbon-supported platinum catalyst obtained by in situ precipitation of platinum dioxide optionally on a carbon support and subsequent reduction thereof. In a preferred embodiment, platinum dioxide is precipitated from dihydrogen hexahydroxyplatinate, $H_2Pt(OH)_6$, also known as platinic acid, optionally adsorbed on a carbon support. The invention takes advantage of the fact that formation of $PtO_2$ colloids requires a thermal activation and a thermal control can therefore mark the onset of a very well defined colloid precipitation, so that a large number of precipitation nuclei centers are simultaneously formed throughout the solution. The resulting $PtO_2$ particles are very small, and in the case of the carbon-supported catalyst, they are adsorbed very quickly on the support, avoiding agglomeration phenomena that would lead to uncontrolled particle size growth.

The preferred use of platinic acid as the starting precursor takes further advantage of the insolubility of such species in dilute acid, opposed to its high solubility in concentrated acid. In this way, pH control may also be used to trigger the precipitation of $PtO_2$, alone or in conjunction with thermal control. In a preferred embodiment, a high active area carbon black is employed as the carbon support. By "high active area", it is intended herein a surface area not lower than 50 $m^2/g$. Several commercially available carbon black species are known to fulfill this requirement, such as Vulcan XC-72 and Black Pearl 2000 from Cabot Corp., and Ketjen Black, commercialized by Akzo Nobel. Other types of electrically conducting carbon particles, such as acetylene blacks or graphite particles may also be advantageously used.

A further advantage in the preparation of platinum catalysts from a $PtO_2$ intermediate is in the easy reduction of the latter to the active Pt species. This can be easily attained by means of most common reducing agents, such as formaldehyde, formic acid, oxalic acid, sodium borohydride and hypophosphite. In a particularly preferred embodiment, the reduction can be carried out under flowing hydrogen gas at high temperature, so that the use of contaminant species is completely avoided.

Under a second aspect, the invention consists of a gas-diffusion electrode obtained by incorporating the above-disclosed catalyst in an electrically conductive web, for instance a carbon woven or non-woven cloth or carbon paper. Under another aspect, the invention consists of a catalyst-coated membrane obtained by incorporating the above-disclosed catalyst on an ion-exchange membrane.

Under yet another aspect, the invention consists of a method for the production of a platinum black or carbon-supported platinum catalyst, comprising reducing in situ-formed platinum dioxide, optionally on a carbon support dispersed in an aqueous solution. In a preferred embodiment, in situ formation of platinum dioxide is obtained by converting a dihydrogen hexahydroxyplatinate precursor, optionally pre-adsorbed on a carbon support and such conversion is preferably carried out by a variation of pH and/or temperature, for instance by controlled addition of an alkali such as caustic soda or of ammonia to the acidic starting solution, for instance until reaching a pH between 2 and 5, and/or by raising the temperature from room temperature to a final temperature comprised between 30 and 100° C., preferably 70° C.

A high active area carbon black is preferably employed as the carbon support and in a preferred embodiment, prior to the adsorption of the precursor, the carbon black support is slurried in concentrated nitric acid, so that the resulting slurry can be used to easily dissolve platinic acid. Other preferably non-complexing strong acids can be used instead of nitric acid such as, for example, $HClO_4$, $H_2SO_4$, $CF_3COOH$, toluenesulfonic acid and trifluoromethanesulfonic acid. In a less preferred embodiment, complexing strong acids such as HCl and HBr may also be used. Non-halide and non-sulfur containing acids are, however, preferred so that the resulting product is free of contaminants and can be reduced at low temperature.

After the preparation, the resulting catalyst can be heat-treated in a controlled atmosphere, optionally in a reducing atmosphere (for example under hydrogen) or an inert atmosphere (for example under argon or nitrogen) at a temperature comprised between 120 and 500° C., more preferably between 200 and 350° C.

The examples disclosed hereafter have the scope of better clarifying some of the preferred embodiments of the invention and shall not be construed as limiting the same.

EXAMPLE 1

A 30% Pt on Vulcan catalyst was prepared as follows: 700 g of Vulcan XC-72, from Cabot Corp., were suspended in 25 liters of deionized water and slurried with a Silverson® disperser for 15 minutes. The homogeneous slurry thus obtained was acidified by adding 0.87 l of 69% without nitric acid and stirred for 30 minutes. 4.13 liters of a 4 M nitric acid solution were then prepared by mixing 3.07 l of deionized water with 1.06 of 69% without $HNO_3$.

468.75 g of $H_2Pt(OH)_6$ (dihydrogen hexahydroxyplatinate, also called platinic acid or PTA) were dissolved in the 4 M $HNO_3$ to produce a solution containing 300 g of platinum. The PTA solution was then added to the slurry over 5 minutes. The slurry was stirred for 30 minutes at room temperature, then heated up to 70° C. over two hours and maintained at 70° C. for one hour. The slurry was then neutralized with concentrated ammonia (about 2.4 liters of 30% $NH_3$) until reaching a pH of about 5. Approximately 300 ml of formic acid were added to the slurry for over one hour to reduce the platinum compound to metal. After the slurry was stirred for an additional hour, the stirrer was removed. The slurry was allowed to cool and settle overnight and the supernatant liquid was decanted on the second day. The slurry was finally filtered and washed with 15 liters of deionized water 6 times. The catalyst cake was dried at 120° C. until reaching a moisture content below 2%. The material was finally ball-milled.

EXAMPLE 2

The method of Example 1 was repeated, with the difference that after raising the temperature of the slurry to 70° C. and holding the same for one hour, the heater and stirrer were removed allowing the slurry to settle overnight. No neutralization or formic acid reduction step was conducted. The slurry was then filtered, washed and dried as described in Example 1. In the final step, the catalyst was reduced with $H_2$ gas at 200° C. for one hour.

EXAMPLE 3

The method of Example 1 was repeated, with the only difference that, instead of formic acid, the slurry was chemically reduced by adding 180 ml of formaldehyde.

EXAMPLE 4

The method of Example 1 was repeated, with the only difference that, instead of adding ammonia to neutralize the slurry, such step was carried out by adding approximately 2.2 liters of 15 M NaOH over one hour. The final pH was controlled at about 5.0.

EXAMPLE 5

The method of Example 1 was repeated, and the catalyst powder obtained was heated up to 350° C. under argon stream for one hour.

EXAMPLE 6

The method of Example 1 was adapted to prepare 60% Pt on Vulcan XC-72. 200 g of Vulcan XC-72 were added to 7.5 liters of deionized water and slurried with the Silverson® disperser for 15 minutes. The slurry was subsequently acidified by adding 0.87 liters of 69% without nitric acid and stirred for 30 minutes. 468.75 g of PTA were dissolved in 4.13 liters of 4 M $HNO_3$ prepared as in Example 1. The PTA solution was added to the slurry. After the slurry was stirred for 30 minutes at room temperature, 17.5 liters of deionized water were added to dilute the slurry. The following steps including heating, neutralization, formic acid addition, filtration, washing, drying and ball milling were the same as described in Example 1.

EXAMPLE 7

A platinum black catalyst was prepared as follows: 468.75 g of PTA (corresponding to 300 g of Pt) were dissolved in a dilute $HNO_3$ solution prepared by mixing 3.0 liters of deionized water with 1.93 liters of 69% w/o $HNO_3$. 25.07 liters of deionized water were added to this solution over one hour under stirring. The mixture was stirred at room temperature for 30 minutes, then heated up to 70° C. over two hours and maintained at 70° C. over two hours and maintained to 70° C. for one hour. An orange-colored suspension was obtained, which was then neutralized with concentrated ammonia (about 2.4 liters of 30% $NH_3$ until reaching a pH of approximately 5.0. 300 ml of formic acid were then added to the suspension over one hour to reduce the platinum compound. The color of the suspension changed from orange to black, and the suspension was settled easily. After the supernatant liquid was decanted, the precipitate was filtered and washed with a total of 15 liters of deionized water divided into six aliquots. The catalyst cake was then dried at 120° C., and the material obtained was finally ball-milled.

EXAMPLE 8

The method of Example 1 was repeated to prepare a 30% Pt catalyst except that the carbon support was Black Pearl 2000 and the catalyst was further treated with $H_2$ gas at 200° C.

EXAMPLE 9

A 40% Pt on Shawinigan acetylene black (SAB) catalyst was prepared as follows: 48.0 g of SAB were added to 1480 ml of deionized water and slurried with the Silveron® disperser for 10 minutes. The slurry was subsequently acidified by adding 0.80 liters of 69% without nitric acid and stirred for 30 minutes. 50.0 g of PTA were dissolved in 440 ml of 4 M $HNO_3$ prepared as in Example 1. The PTA solution was then added to the slurry. After stirring for 30 minutes at room temperature, 1000 ml of deionized water were added to dilute the slurry. The slurry was stirred for an additional 30 minutes at room temperature, then heated up to 70° C. over two hours and maintained at 70° C. for one hour. The slurry was then neutralized with concentrated ammonia until reaching approximately pH 5.0.

32 ml of formic acid were added to the slurry over one hour to reduce the platinum compound to metal. The slurry was then stirred for one more hour, cooled, filtered and washed with 900 ml of deionized water divided into six aliquots. The catalyst cake was then dried at 120° C. until the moisture content was less than 2%. The material obtained was finally ball-milled.

EXAMPLE 10

The method of Example 9 was repeated to prepare a 40% carbon-supported Pt catalyst, except that the carbon support was Ketjen Black 600 and the catalyst was further treated with $H_2$ gas at 200° C.

EXAMPLE 11

A rotating disk electrode (RDE) was employed to evaluate the catalyst activity of the previous samples and of two catalysts of the prior art toward oxygen reduction. The catalysts of the prior art were respectively 30% and 60% Pt on Vulcan XC-72, prepared from platinum sulfite acid ($H_3Pt(SO_3)_2OH$) in accordance with the method disclosed in U.S. Pat. No. 3,992,512.

For the 30% Pt carbon-supported catalysts, the procedure is as follows: a dilute ink was prepared by mixing 25 mg of catalyst with 50 ml of acetone. A total of 20 µl of this ink was applied in four coats onto the tip of a glassy carbon rotating electrode (4 mm diameter). The total Pt loading on the electrode was 3 µg. Once the ink dried, an additional layer of 0.26 mg/ml of Nafion® was deposited by applying 5 µl of 5% by weight of Nafion suspension (from Solution Technology, USA) and evaporated to dryness.

For the 40% Pt carbon-supported catalysts, 31.3 mg of the sample were used to make the ink; the total Pt loading on the electrode is 5 µg.

For the 60% Pt carbon-supported catalysts, 41.7 mg of the sample were used to make the ink; the total Pt loading on the electrode is again 5 µg.

For the platinum black catalyst, 50 mg were used to make the ink, and the Pt loading was 20 µg. The Pt loading changed for all the catalyst because a surface completely covered by catalyst is required. Comparisons in terms of activity should only be made between catalysts having the same percentage loading.

After the above-described preparation, the electrode was placed in a 0.5 M $H_2SO_4$ solution saturated with $O_2$ at 60° C. by continuous bubbling. A platinum counter electrode and an Hg—$Hg_2SO_4$ reference electrode were connected to a Gamry PC4/750 mA Potentiostat/Galvanostat along with the RDE. A potential scan was applied under a 3600 RPM rotation and the relevant current-potential curve was recorded, showing a current plateau corresponding to reduction of dissolved oxygen. The potential at one half of the plateau height (RDE half-wave potential, $E_{1/2}$) was used as the analytical indicator for the oxygen reduction reaction on the catalyst. More positive potentials indicate a greater facility for oxygen reduction.

Table 1 reports RDE half-wave potential data for the different catalysts of Examples 1 to 10 (EX1 to EX10) and for the control samples consisting of the aforementioned 30% and 60% Pt on Vulcan XC-72, prepared from platinum sulfite acid ($H_3Pt(SO3)2OH$), respectively, indicated as C30 and C60. The same table also reports XRD crystalline sizes of the different samples. For all the 30% Pt samples prepared in accordance with the present invention, the half-wave potential was higher than for the corresponding control sample C30; for all of theses samples except EX 5, the XRD size was also smaller than for the control sample. The larger size of EX 5 sample was likely due to the thermal post-treatment at 350° C. These data indicate that the samples of the invention have a more uniform distribution over the support. The good activity is also associated with the absence of poisoning ligands, such as chloride and sulfur-containing ligands. For 60% Pt/C samples, similar results were observed. Examples 9 and 10 finally show that the invention can be applied to different carbon substrates, resulting in good performances.

| Sample No. | Catalyst | RDE half-wave Potential ($E_{1/2}$, mV) | Crystalline size (nm) |
|---|---|---|---|
| EX1 | 30% Pt/Vulcan XC-72 | 135 | 2.7 |
| EX2 | 30% Pt/Vulcan XC-72 | 128 | 3.3 |
| EX3 | 30% Pt/Vulcan XC-72 | 133 | 2.8 |
| EX4 | 30% Pt/Vulcan XC-72 | 132 | 2.6 |
| EX5 | 30% Pt/Vulcan XC-72 | 135 | 3.7 |
| EX8 | 30% Pt/Black Pearl 2000 | 120 | 3.0 |
| C30 | 30% Pt/Vulcan XC-72 | 116 | 3.5 |
| EX6 | 60% Pt/Vulcan XC-72 | 160 | 4.1 |
| C60 | 60% Pt/Vulcan XC-72 | 132 | 7.0 |
| EX7 | Pt black | 174 | 5.3 |
| EX9 | 40% Pt/SAB | 135 | 4.1 |
| EX10 | 40% Pt/Ketjen Black | 124 | 2.2 |

Various modifications of the invention may be made without departing from the spirit or scope thereof and it is to be understood that the invention is intended to be limited only as defined in the appended claims.

What we claim is:

1. A method for the production of a carbon-supported platinum catalyst comprising:

(i) formation of platinum dioxide on a carbon support in an aqueous solution, said platinum dioxide being in situ-formed from of dihydrogen-hexahydroxyplatinate in an acidic solution by variation of the pH between 2 and 5 and/or temperature between 30 and 100° C. and said carbon support slurried in a non-complexing strong acid, (ii) chemically reducing in situ-formed platinum dioxide on a carbon support in an aqueous solution, with a reducing agent selected from the group consisting of formaldehyde, formic acid, oxalic acid, sodium borohydride and hypophosphite (iii) performing a thermal treatment in a controlled atmosphere between 120 and 500° C.

2. The method of claim 1 wherein said in situ formation of platinum dioxide is obtained by converting a dihydrogen hexahydroxyplatinate precursor pre-adsorbed on said carbon support.

3. The method of claim 1 wherein said variation of pH is obtained by the addition of caustic soda or ammonia.

4. The method of claim 3 wherein said addition of caustic soda or ammonia is effected up to a pH between 2 and 5.

5. The method of claim 1 wherein said variation of temperature consists of bringing said aqueous solution from room temperature to a final temperature of 30 to 100° C.

6. The method of claim 1 wherein said carbon support is a carbon black having an active area not lower than 50 $m^2/g$.

7. The method of claim 6 wherein said carbon black is slurried in a strong acid selected from the group consisting of $HNO_3$, $HClO_4$, $CF_3COOH$, toluenesulfonic acid, trifluoromethanesulfonic acid, HCl, HBr, prior to the adsorption of said dihydrogen hexahydroxyplatinate precursor.

8. The method of claim 7 wherein said variation of pH is obtained by the addition of caustic soda or ammonia.

9. The method of claim 8 wherein said addition of caustic soda or ammonia is effected up to a pH between 2 and 5.

10. The method of claim 1 wherein said controlled atmosphere is a reducing atmosphere or an inert atmosphere.

11. A method for the production of a platinum black catalyst comprising chemically reducing platinum dioxide formed in situ by conversion of dihydrogen-hexahydroxyplatinate from an acidic solution by variation of the pH between 2 and 5 and/or temperature between 30 and 100° C.

12. The method of claim 11 wherein said variation of temperature consists of bringing said aqueous solution from room temperature to a final temperature of 30 to 100° C.

13. A method for the production of a carbon-supported platinum catalyst comprising:

(i) formation of platinum dioxide on a carbon support in an aqueous solution, said platinum dioxide being in situ-formed from of dihydrogen-hexahydroxyplatinate in an acidic solution by variation of the pH between 2 and 5 and/or temperature between 30 and 100° C. and said carbon support slurried in a non-complexing strong acid, (ii) chemically reducing in situ-formed platinum dioxide on a carbon support in a reducing agent selected from the group consisting of hydrogen gas during a thermal treatment in a controlled atmosphere between 120 and 500° C.

* * * * *